C. R. SHORT.
CLUTCH MECHANISM.
APPLICATION FILED JUNE 11, 1917.
1,345,897.
Patented July 6, 1920.
2 SHEETS—SHEET 1.
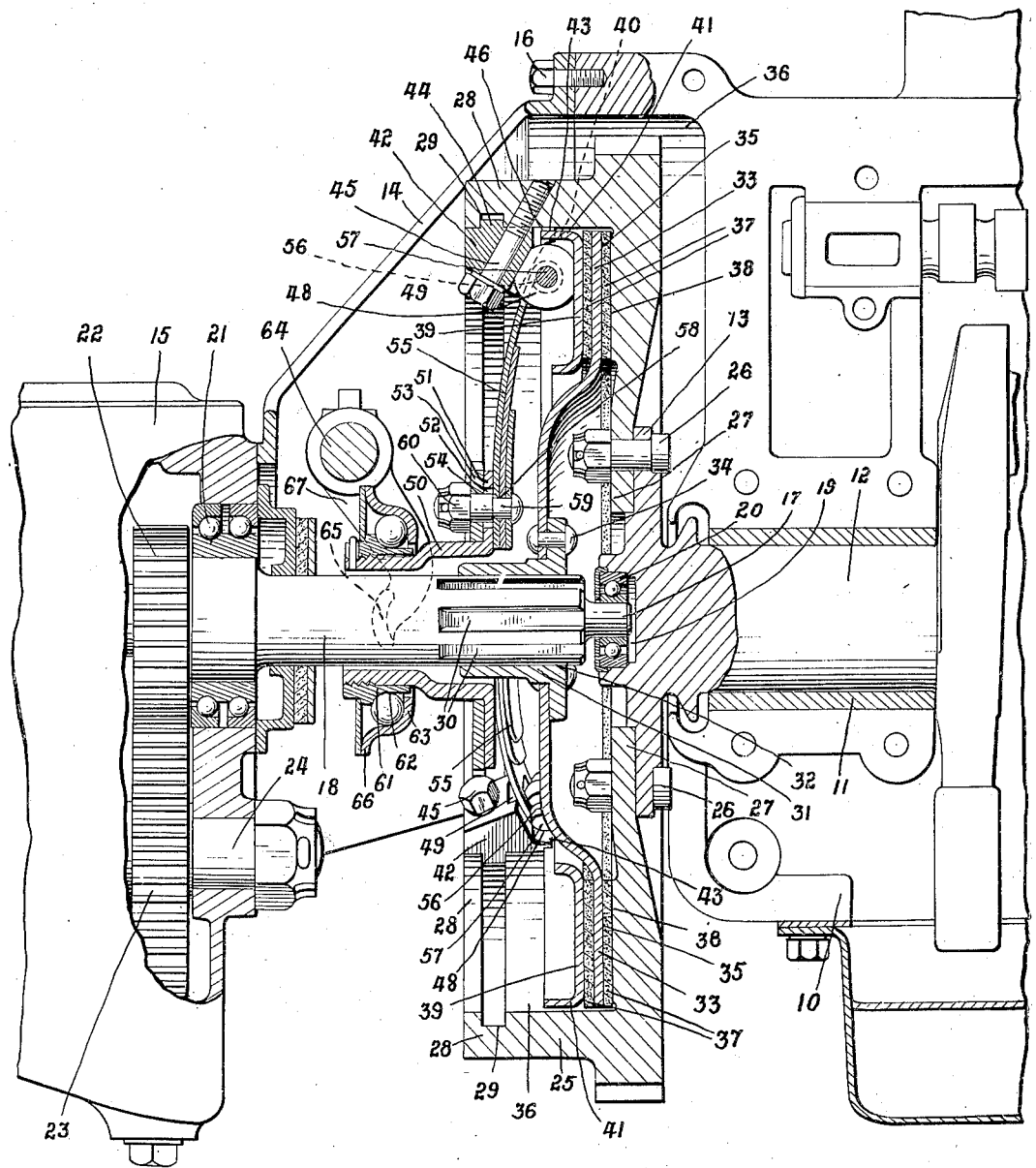
Fig. I.
INVENTOR:
CHARLES R. SHORT,
ATTORNEY.

C. R. SHORT.
CLUTCH MECHANISM.
APPLICATION FILED JUNE 11, 1917.
1,345,897.
Patented July 6, 1920.
2 SHEETS—SHEET 2.
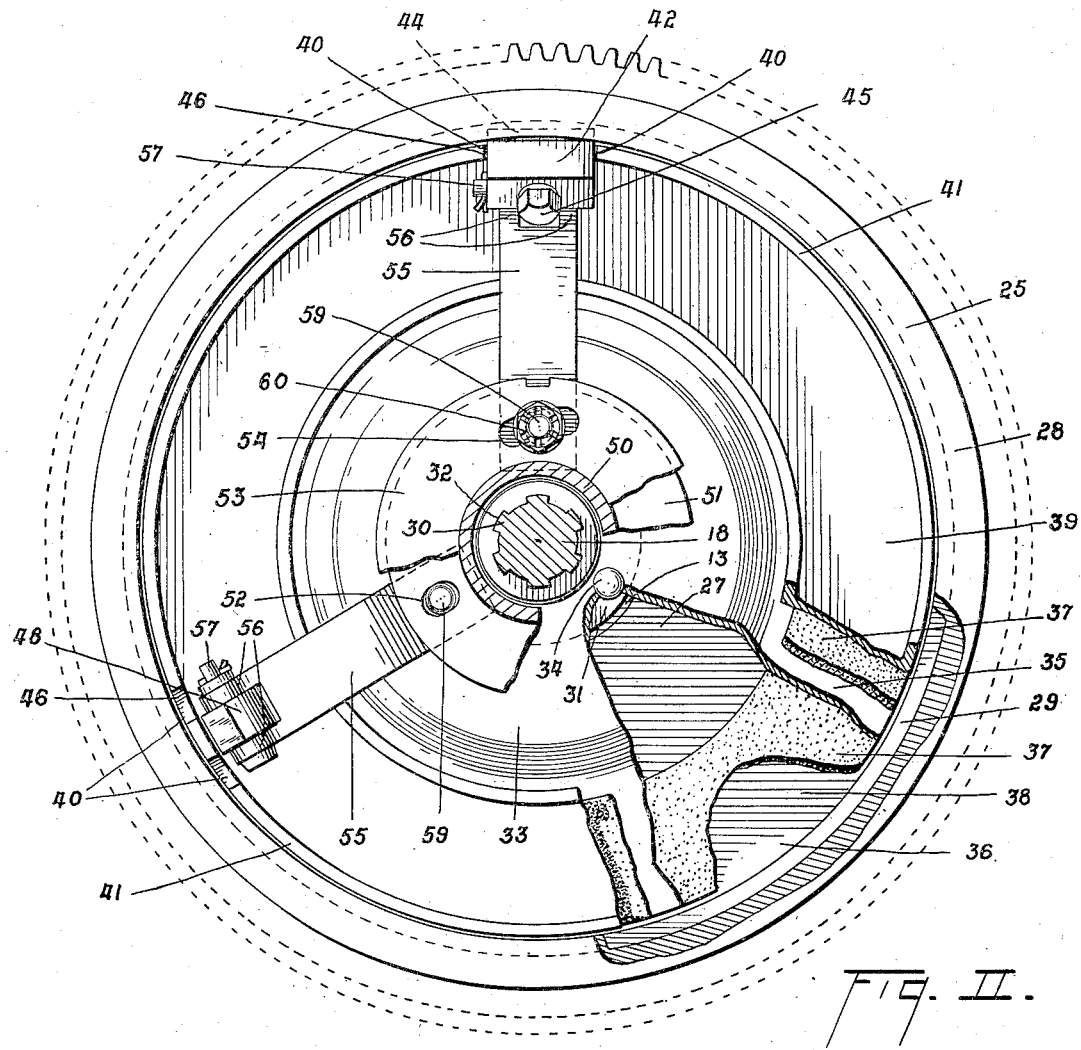
Fig. II.
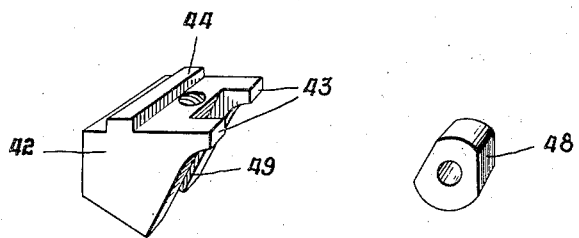
Fig. III.  Fig. IV.
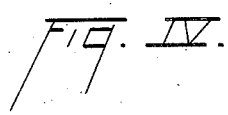
INVENTOR:
CHARLES R. SHORT,
BY
ATTORNEY.

UNITED STATES PATENT OFFICE.

CHARLES R. SHORT, OF DETROIT, MICHIGAN.

CLUTCH MECHANISM.

1,345,897.  Specification of Letters Patent.  Patented July 6, 1920.

Application filed June 11, 1917. Serial No. 174,169.

*To all whom it may concern:*

Be it known that I, CHARLES R. SHORT, a subject of the King of Great Britain, and resident of Detroit, Wayne county, State of Michigan, have invented certain new and useful Improvements in Clutch Mechanism, of which the following is a specification.

This invention relates to hydrocarbon motors, and more particularly to improvements in clutches, especially adapted for use therewith.

One of the objects of this invention is to provide a simple and improved clutch, which while efficient and positive in action, is simple and of light weight construction.

Another object of this invention is to provide an improved clutch having a minimum weight mounted on or secured to its driven element, thus reducing the inertia and momentum of this element to a minimum, so that when the clutch is connected to a change speed gear transmission, the shifting of gears is rendered much easier.

Another object of this invention is to improve and simplify the general construction and arrangement of the driving and driven members of a disk clutch and to also improve its operating or clamping mechanism.

Another object of this invention is to provide a clutch wherein the action of centrifugal force tends to increase the clamping action between the driving and driven elements thereof.

These and other objects will more clearly appear from the following description, taken in connection with the accompanying drawings which form a part of this specification, and in which;

Figure 1 is a fragmentary vertical section, with portions broken away, of the rear portion of a hydrocarbon motor unit power plant, embodying a preferred form of my invention;

Fig. 2 is a rear elevation with portions broken away of the clutch illustrated in Fig. 1.

Fig. 3 is a perspective view of an abutment for the driven member of the clutch; and Fig. 4 is a perspective view of one of the cam or wedging members.

Referring to the drawings, 10 represents the motor crank case in which is mounted in bearings 11, a crank shaft 12, which is provided at its rear end with a driving flange 13. The usual bell housing 14 and transmission gear box 15 are shown secured to the rear end of the crank case as by bolts 16. The forward reduced end 17 of a driven shaft 18 is adapted to be supported in an anti-friction bearing 20 in a recess 19, which is formed in the rear end of the driving shaft 12. The rear end of the driven shaft is suitably mounted in the gear box 15 in an anti-friction bearing 21. Intermeshing gears 22 and 23 are shown as respectively arranged on the driven shaft 18 and the usual countershaft 24.

The motor fly wheel 25 is arranged at the rear end of the crank shaft 12 and is secured in position by bolts 26, connecting the driving flange 13 with the web portion 27 of the wheel. The wheel is provided with a rearwardly extending flange 28 in the interior of which may be formed a circumferentially extending groove 29.

The forward portion of the driven shaft 18 is formed with splines 30 on which is adapted to be arranged, an axially movable collar 31 which is provided interiorly thereof with complementary splines 32. A driven disk 33 may be secured to the collar 31 as by rivets 34 with its driving periphery 35 arranged in the interior 36 of the drum formed by the fly wheel 25, with a pair of friction disks 37 disposed at opposite sides thereof, and forming liners between the driven plate 33 and the fly wheel friction surface 38 on one side and a clamping plate 39 on the other side.

The clamping plate 39 is preferably formed of U cross section with several pairs of notches 40 cut in its outer flange 41. The clamping plate is maintained against relative rotary movements with the driving member 25, while an axial movement therewith is permitted, by fitting laterally extending pairs of lugs 43, which are formed on each of a plurality of abutments 42 in the pairs of adjacent notches 40 formed in the clamping plate 39. The tongue 44 which is formed on the upper side of each of the abutments is fitted in the groove 29 of the fly wheel flange 28 and secured in position by means of bolts 45. When these abutments are in position, it will be noted that three equidistantly arranged spline connections 46 are formed between the clamping plate 39 and the driving member 25.

Means for normally maintaining the driving and driven members of the clutch in driving contact, may be provided by arranging wedge shaped cam members 48 between the clamping plate 39 and the inclined side of the abutments 42. These members are adapted to be maintained against relative rotary movements with the adjacent members, by fitting them in the grooves 49 which are formed in the inclined sides of the abutments.

A shifting sleeve 50 surrounds the driven shaft 18 in spaced relation thereto and is provided at one end with an outwardly extending flange 51 in which are formed three radial slots 52. A cam plate 53 which is formed with three cam slots 54, is adapted to be arranged on the sleeve 50 with the slots 54 registering with the radial slots 52. Three radially extending leaf springs 55 are equidistantly arranged about the sleeve 50, each having its outer end, provided with a pair of eyes 56 through which may be inserted pins 57 for securing the outer end of the spring to a cam member 48. The inner end of each of the springs is provided with an opening 58; and a threaded stud 59 is adapted to be passed through this opening and the slots 52 and 54 for mounting the springs in position. It will be noted that if it is desired to adjust the cam members 48 outwardly for increasing their effectiveness, the plate 53 may be rotated on its axis relative to the sleeve flange 51 and the cam slots 54 will cause the studs 59 to be moved in a radial direction. After the desired adjustment has been effected, the springs 55 and the cam plate 53 may be maintained in adjusted relation by tightening of the nuts 60 on the studs 59. While the sleeve 50 forms a connecting link between the three clamping springs 55, it is to be noted that this sleeve has a floating support on them.

The adjustment of the springs 55 and the cam members 48 at their free outer ends outwardly is obviously to compensate for the wear of the friction disks carried by the plate 33; and it will be appreciated that as the disks wear and the springs have to assume a more nearly straight position, in order to secure driving action through the clutch mechanism, the wedging means will act with the greater force against the clamping plate 39 the more nearly straight the springs become, thus providing clutch mechanism in which the gripping action becomes greater as the friction disks wear, until of course they become worn to such an extent as to cease to drive the vehicle whereupon the clutch has to be adjusted as hereinbefore explained. The force exerted by the springs through the wedging means upon the clutching members is thus the least when the friction disks are new and have to be pressed with the least force against the clamping plate and fly wheel in order to secure sufficient gripping action; whereas when the disks have become worn, and greater pressure is necessary in order to secure driving action, such increase in pressure is secured by and follows from the fact that the springs are then more nearly straight when the clutch mechanism is operating to drive the device driven through the same, thus securing approximately uniform gripping action throughout the life of the clutch disks.

The sleeve 50 may be shifted laterally for varying the spring pressure on the cams 48, and thereby disengaging the clutch members by arranging at one end of the sleeve 50 a threaded bearing race 61, a bearing 62 and an outer race 63. The usual fork 67, for shifting the sleeve 50, may be trunnioned on a shaft 64 with its shoes 65 adapted to be thrust against an outer flange 66 on the race 63.

It will be noted that the only clutch part which is secured for constant rotation with its driven shaft 18, is a very light driven plate 33 and its supporting collar 31, and also that the cams 48 are so mounted in relation to the springs 55 and the sleeve 50 that the action of centrifugal force tends to increase the binding and clamping action between the driving and driven members of the clutch.

While I have described and will specifically claim what I deem to be a preferred embodiment of my invention, it may be obvious to those skilled in the art, that various modifications and changes may be made without departing from the spirit and scope hereof.

Having thus described my invention, what I claim and desire to secure by Letters Patent is:

1. In a device of the class described, the combination with a driving member, a driven disk and a clamping plate, of means comprising a plurality of radially arranged springs, and a plurality of wedging devices operated one by each of said springs for operatively connecting said member, disk and plate together.

2. In a device of the class described, the combination with a driving member, a driven disk and a clamping plate, of means for connecting said member, disk and plate together, comprising a plurality of radially arranged springs, a plurality of radially movable cam members arranged adjacent said clamping plate and connected one with each of said springs, and a like number of abutments carried by said driving member and with which said cam members coöperate.

3. In a device of the class described, the combination with a shaft, a driving member secured thereto and having an axially movable clamping plate mounted thereon, a driven shaft and an axially movable disk secured to said driven shaft and having its periphery arranged between said driving member and said clamping plate, and a sleeve surrounding one of said shafts, of wedging members operably connecting said clamping plate and said driving member, and springs operably connecting said wedging members and said sleeve.

4. In a device of the class described, the combination with a driving shaft, a driven shaft, one of said shafts having a member fixed thereto and an axially movable clamping plate secured to said member, of another member arranged between said first member and said clamping plate and having an axially movable connection and rotatable with said other shaft, and a sleeve surrounding one of said shafts and means for bringing said clamping plate and said members into driving contact comprising cam members and yielding connecting members.

5. In a device of the class described, a driving shaft, a driven shaft, a member having a friction driving surface connected with one of said shafts, a plurality of abutments on said member, an axially movable clamping plate secured to said member, and an axially movable friction disk between said surface member and said clamping plate and secured to said other shaft, of means arranged between said abutments and said clamping plate for bringing said friction disk and said friction surface into driving contact, and spring mechanism operatively connected with said moving means for operating the same.

6. In a device of the class described, a driving shaft, a driven shaft, a member having a friction driving surface connected with one of said shafts, a plurality of abutments on said member, an axially movable clamping plate secured to said member, and an axially movable friction disk arranged between said member and said clamping plate and secured to said other shaft, of wedging means between said abutments and said clamping disk for bringing said friction disk and said friction surface into driving contact, and yielding members for actuating said wedging means.

7. In a device of the class described, a driving shaft, a driven shaft, a member having a friction driving surface connected with one of said shafts, a plurality of abutments on said member, an axially movable clamping plate secured to said member and an axially movable friction disk between said member and said clamping plate and secured to said other shaft, of wedging means between said abutments and said clamping disk for bringing said friction disk and said friction surface into driving contact, yielding members for actuating said wedging means, and manual means for varying the position of said yielding members.

8. In a device of the class described, a driving shaft, a driven shaft, a member having a friction driving surface connected with one of said shafts, a plurality of abutments on said member, an axially movable clamping plate secured to said member, and an axially movable friction disk between said member and said clamping plate and secured to said other shaft, of wedging means between said abutments and said clamping disk for bringing said friction disk and said friction surface into driving contact, and a plurality of radially arranged yielding members for actuating said wedging means.

9. In a device of the class described, a driving shaft, a driven shaft, a member having a friction driving surface connected with one of said shafts, a plurality of abutments on said member, an axially movable clamping plate secured to said member, and an axially movable friction disk between said member and said clamping plate and secured to said other shaft, of wedging means between said abutments and said clamping disk for bringing said friction disk and said friction surface into driving contact, a movable sleeve surrounding one of said shafts, and a plurality of radially arranged springs connecting said wedging means and said sleeve.

10. In a device of the class described, a driving shaft, a driven shaft, a member having a friction driving surface connected with one of said shafts, a plurality of abutments on said member, an axially movable clamping plate secured to said member, and an axially movable friction disk between said member and said clamping plate and secured to said other shaft, of wedging means between said abutments and said clamping disk for bringing said friction disk and said friction surface into driving contact, a movable sleeve surrounding one of said shafts and a plurality of radially arranged springs connecting said wedging means and said sleeve, and adjusting means intermediate said wedging means and said sleeve.

11. In a device of the class described, a driving shaft, a driven shaft, a member having a friction driving surface and connected with one of said shafts, a plurality of abutments on said member, an axially movable clamping plate secured to said member, and an axially movable friction disk between said member and said clamping plate and secured to said other shaft, of wedging means between said abutments and said clamping disk for bringing said friction disk and said friction surface into driving contact, a movable sleeve surrounding one of said shafts, a plurality of radially arranged springs connecting said wedging means and said sleeve, and a cam for adjusting the said springs relative to said sleeve.

12. In a device of the class described, the combination with a driving shaft, a driven shaft, a friction member secured to one of said shafts and having an axially movable clamping plate mounted thereon, said member also having a plurality of abutments, a friction plate between said member and said clamping plate and having an axially movable connection with said other shaft, and a plurality of cam members between the periphery of said clamping plate and said abutments, of a sleeve surrounding one of said shafts, and a plurality of equidistant radially arranged springs on said sleeve and each connected with one of said cam members.

13. In a device of the class described, the combination with a driving shaft, a driven shaft, a friction member secured to one of said shafts and having an axially movable clamping plate mounted thereon, said member also having a plurality of abutments, a friction plate between said member and said clamping plate and having an axially movable connection with said other shaft, and a plurality of cam members arranged between the periphery of said clamping plate and said abutments, of a sleeve surrounding one of said shafts, and a plurality of leaf springs radially arranged on said sleeve and each connected with one of said cam members.

14. In a device of the class described, the combination with a driving shaft, a driven shaft, a friction member secured to one of said shafts and having an axially movable clamping plate mounted thereon, said member also having a plurality of abutments, a friction plate between said member and said clamping plate and having an axially movable connection with said other shaft and a plurality of cam members arranged between the periphery of said clamping plate and said abutments, of a sleeve surrounding one of said shafts, a plurality of leaf springs radially arranged on said sleeve and each connected with one of said cam members, and an adjustable cam for adjusting the relation of said springs to said sleeve.

15. In a device of the class described, the combination with a driving shaft, a driven shaft, and axially movable coöperating friction disks operatively connected with each of said shafts, of a plurality of radially arranged springs and wedging members operatively connected with said springs and adapted to coöperate with abutments which are fixed relative to said springs to thereby normally maintain said disks in driving contact.

16. In a device of the class described, the combination with a driving shaft, a driven shaft, and axially movable coöperating friction disks operatively connected with each of said shafts, of means for normally maintaining said disks in driving contact, comprising a plurality of cams, a plurality of connected radially arranged springs, and a plurality of abutments fixed relative to said cams and with which said cams coöperate.

17. In a device of the class described, the combination with a driving shaft, a driven shaft, and axially movable coöperating friction disks operatively connected with each of said shafts, of means for normally maintaining said disks in driving contact, comprising a plurality of cams, a plurality of connected radially arranged leaf springs, a relatively fixed abutment against which said cams act.

18. The combination with a driving shaft, a drum secured thereto, a plurality of abutments detachably secured to the interior of said drum, an axially movable clamping plate arranged in said drum and adapted to be maintained by said abutments against relative rotary movement, a plurality of cams arranged between said clamping plate and said abutments, and a driven shaft, of a driven disk and a plurality of floating friction members arranged between one end of said drum and said clamping plate, said driven disk being splined to said driven shaft, a sleeve surrounding and spaced from said driven shaft, said sleeve being provided with a plurality of radially arranged leaf springs, each adapted to be connected with one of said cam members and means for adjusting the relation of said springs to said sleeve, comprising a cam plate.

In testimony whereof I affix my signature.

CHARLES R. SHORT.